Figure 1:
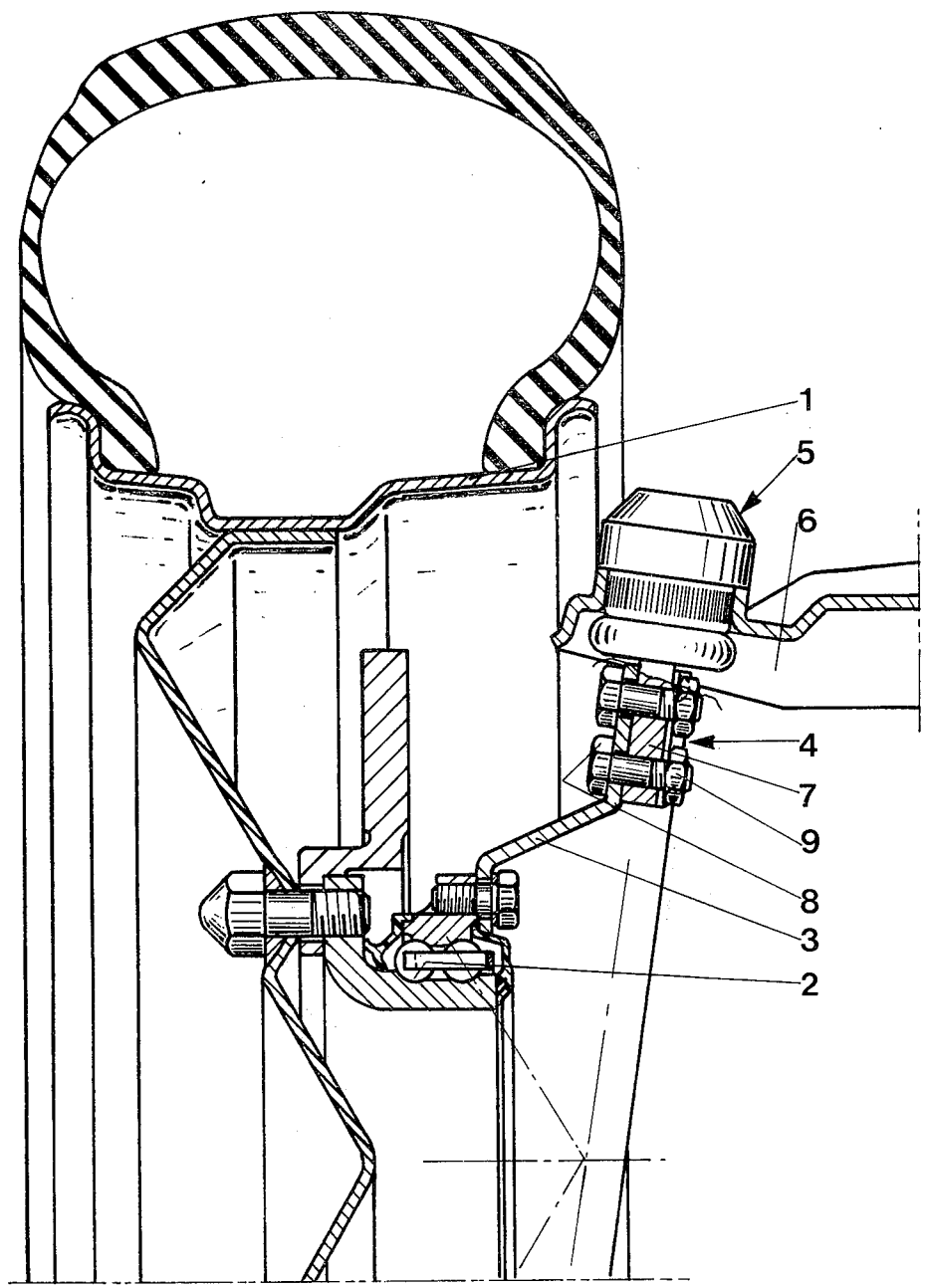

United States Patent [19]

Åsberg

[11] 3,967,857
[45] July 6, 1976

[54] SPINDLE FOR A VEHICLE WHEEL, PROVIDED WITH AT LEAST ONE BALL JOINT

[75] Inventor: Sture L. Åsberg, Partille, Sweden

[73] Assignee: SKF Industrial Trading and Development Company, B.V., Jutphaas, Netherlands

[22] Filed: Oct. 7, 1974

[21] Appl. No.: 512,513

[30] Foreign Application Priority Data
Oct. 18, 1973 Sweden .................................. 7314189

[52] U.S. Cl. ............................... 301/125; 280/96.1
[51] Int. Cl.² .......................................... B60B 35/00
[58] Field of Search ............ 280/95 R, 96.1, 96.2 R, 280/96.2 A, 96.2 B, 96.3; 301/124 R, 125, 131, 132; 180/85

[56] References Cited
UNITED STATES PATENTS

| | | | |
|---|---|---|---|
| 2,556,767 | 6/1951 | McCann | 280/96.1 |
| 3,865,394 | 2/1975 | Epner | 280/96.1 |

Primary Examiner—Stanley H. Tollberg
Assistant Examiner—D. W. Keen
Attorney, Agent, or Firm—Daniel M. Rosen

[57] ABSTRACT

Steering spindle for a vehicle wheel, provided with at least one ball joint, characterized by that the spindle is made of pressed sheet metal and comprises a mainly flat portion adapted for fastening a ball joint, which ball joint comprises a fastening part provided with a corresponding mainly plate-shaped portion, the device comprising means for joining said portions.

12 Claims, 6 Drawing Figures

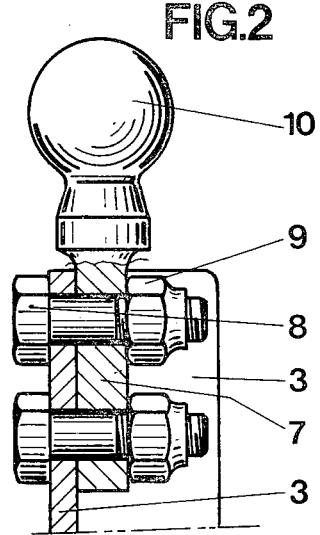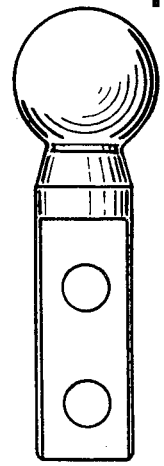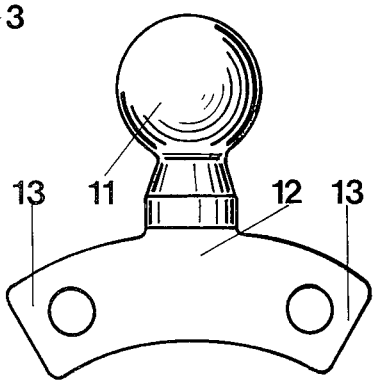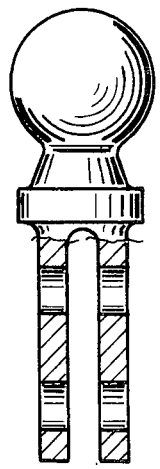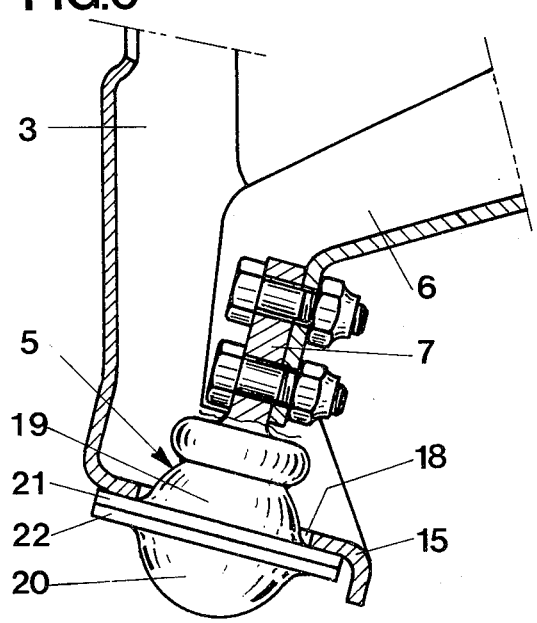

SPINDLE FOR A VEHICLE WHEEL, PROVIDED WITH AT LEAST ONE BALL JOINT

This invention relates to a steering spindle for a vehicle wheel, provided with at least one ball joint.

In conventional wheel suspension constructions, the vehicle wheel is suspended and mouned at a steering king pin, which in its turn is articulated with the dumb irons of the vehicle. Also, the steering connecting rod is in articulated connection with the steering spindle. The steering king pin in these constructions is forged or cast and, consequently, heavy and expensive. The steering spindle, as already mentioned, is articulated at a joint with the dumb irons, which joint is realized by means of ball joints, the ball part of which is supported in a cup-shaped member, usually in the dumb iron. The fastening part of the ball joint usually is either a cylindrical pin fitted into a bore in the steering spindle and locked therein by special means, or it is of cone shape and inserted into a corresponding conical bore in the steering spindle or dumb iron. The fastening of this kind of ball joint is effected by means of a thread and nut.

According to the present invention, a steering spindle is proposed which is easier and cheaper to manufacture and easy to mount, but yet meets the specified requirements. The invention is described in greater detail in the following, with reference to the accompanying drawings, in which FIG. 1 shows a partial cross-section through a wheel suspension with a steering spindle according to the invention, FIG. 2 shows a cross-section through a fastening device for a ball joint for the suspension of FIG. 1, FIG. 3 is a side view of the fastening device shown in FIG. 2, FIG. 4 is a side view of a modified fastening device for a ball joint, FIG. 5 shows a section through a ball joint member with fork-shaped fastening device, FIG. 6 shows a section through a part of a modified fastening device according to the invention.

Referring to FIG. 1, 1 designates the rim of a vehicle wheel, 2 designates the bearing assembly of the wheel, and 3 the steering spindle of the wheel, the spindle being made of pressed sheet metal. The steering spindle is fixed to the flanged outer ring of the bearing assembly. The ball joint member of the steering spindle is designated by 5, and the dumb iron of the vehicle is designated by 6. In the embodiment shown, the fastening part of the ball joint member 5 is designated as a plate-shaped member 7 attached to the steering spindle 3 by means of screws 8 and nuts 9. The fastening may also be obtained by riveting or welding. The aforedescribed ball joint arrangement is shown on a larger scale in the FIGS. 2 and 3 where the ball of the member is designated by 10. 3' designates a bentover reinforcing edge on the steering spindle 3, which is manufactured, for example, of sheet metal. In FIG. 4 a modified ball joint member is shown comprising the ball 11 and the plate-shaped fastening part 12, which part is formed with two wings 13 extending from the centre line of the member to each direction. FIG. 5 shows a ball joint member with a fork-shaped portion.

In FIG. 6 an inverse variation of a fastening device is illustrated. The edge of the steering spindle 3 includes a bore 18. The outer casing of the ball joint member is divided into two shell, 19 and 20, which are provided with flanges, 21 and 22, by means of which the ball joint member 5 is fastened on the steering spindle 3. In this aforedescribed embodiment the fastening is effected in a manner opposite to that previously described, i.e. the fastening part of the member 5 is attached to the dumb iron 6, and the ball part of the member rests in the socket means formed by the shells 19, 20 mounted in the bore 18 of the steering spindle 3. In this arrangement the shell may be pressed into the bore 18, with the sheet metal of the spindle 3 being upset to hold the shell.

The invention is not restricted to the embodiments described above, but can be varied in several ways within the scope of the following claims.

What is claimed is:

1. In a suspension system for the wheel of a vehicle of the type having a steering spindle articulated at a joint with a further member; the improvement wherein said spindle comprises a pressed sheet metal member, one of said spindle and further member having a substantially flat portion, a ball joint member having a ball and a plate-shaped means depending therefrom, means for affixing said plate-shaped means to said substantially flat portion, and means for connecting said ball to the other of said sheet metal member and further member to form an articulated joint.

2. The suspension system of claim 1, wherein said plate-shaped means and substantially flat portion have corresponding bores extending therethrough, and further comprising fastening means extending through said bores for affixing said plate-shaped means to said substantially flat portion.

3. The suspension system of claim 1, wherein said plate-shaped means is welded to said substantially flat portion.

4. The suspension system of claim 1, wherein said plate-shaped means is fork-shaped.

5. The fastening device of claim 1, wherein said plate-shaped member extends substantially longitudinally of said ball joint member.

6. The system of claim 1, wherein said plate-shaped member comprises a member having two wings which extend substantially normal and on opposite sides of the longitudinal axis of said ball joint member.

7. The system of claim 1, wherein said sheet metal member has a bore, comprising a shell mounted in said bore, said ball means inserted in said shell to form said articulated joint, and said plate-shaped means is affixed to said further member.

8. The system of claim 7, wherein said shell has a flange affixed to said sheet metal member surrounding said bore.

9. The system of claim 8, wherein said shell is pressed into said bore in said sheet metal member, the metal of said sheet metal member being upset to hold said shell in said bore.

10. The system of claim 1, wherein said substantially flat portion is on said sheet metal member.

11. The system of claim 1, wherein said substantially flat portion is on said further member.

12. The system of claim 1, further comprising a bearing assembly for mounting said wheel, said bearing assembly comprising an inner ring affixed to said wheel, and a flanged outer ring, said steering spindle being affixed to said flanged outer ring.

* * * * *